United States Patent [19]

Robinson et al.

[11] Patent Number: 4,916,180

[45] Date of Patent: Apr. 10, 1990

[54] BUTYL RUBBER/POLYPROPYLENE ELASTOPLASTIC

[75] Inventors: Keith J. Robinson, Sarnia, Canada; Michel Longuet, Strasbourg, France

[73] Assignee: Polysar Limited, Sarnia, Canada

[21] Appl. No.: 291,677

[22] Filed: Dec. 29, 1988

[51] Int. Cl.$^4$ ............... C08L 23/12; C08L 23/26; C08L 9/00

[52] U.S. Cl. ............... 524/456; 525/194; 525/232; 524/525; 524/496

[58] Field of Search ............... 525/194, 232, 236, 237; 524/456

[56] References Cited

U.S. PATENT DOCUMENTS

| | | | |
|---|---|---|---|
| 2,671,774 | 3/1954 | McCracken et al. | 260/80.7 |
| 3,037,954 | 6/1962 | Gessler et al. | 260/29.8 |
| 3,073,797 | 1/1963 | Fischer et al. | 260/45.5 |
| 3,184,522 | 5/1965 | Zagar | 260/889 |
| 3,265,770 | 8/1966 | Edwards | 260/889 |
| 3,584,080 | 6/1971 | Walker et al. | 260/889 |
| 3,806,558 | 4/1974 | Fischer | 525/194 |
| 3,909,463 | 9/1975 | Hartman | 260/2.5 F |
| 4,130,534 | 12/1978 | Coran et al. | 260/33.6 AQ |

Primary Examiner—Carman J. Seccuro
Attorney, Agent, or Firm—Stevens, Davis, Miller & Mosher

[57] ABSTRACT

The present invention provides an elastoplastic composition comprising a butyl terpolymer rubber and polypropylene, which composition is characterized by being treated with a peroxide curing agent.

8 Claims, No Drawings

BUTYL RUBBER/POLYPROPYLENE ELASTOPLASTIC

The present invention relates to elastoplastic compositions containing a butyl terpolymer rubber and polypropylene, which compositions are characterized by being treated with a peroxide curing agent.

BACKGROUND OF THE INVENTION

Thermoplastic blends of polypropylene resin and butyl rubber are known. U.S. Pat. No. 3,037,954 (Gessler et al) teaches a composition which comprises from about 5 to 50 weight per cent chlorinated butyl rubber and from 95 to 50 weight per cent polypropylene. The composition is prepared by a dynamic vulcanization process, in which the composition is simultaneously mixed and cured, thereby crosslinking the rubber and then dispersing it as small particles throughout the composition.

Additionally, U.S. Pat. No. 4,130,534 (Coran et al) describes elastoplastic blends of from 20 to 5 parts polypropylene and from 80 to 55 parts by weight butyl rubber. Coran et al specifically teach that these blends cannot be prepared with an organic peroxide as the sole vulcanizing agent.

Blends of butyl rubber and polyethylene are similarly well known.

U.S. Pat. No. 3,073,797 (Fischer et al) discloses a process whereby a blend of butyl rubber and polyethylene is cured with a combination of a peroxide and N-methyl-N-nitroso-4-nitrosoaniline. Comparative examples contained in this patent illustrate that inferior products result when peroxide is used as the sole curing agent.

U.S. Pat. No. 3,184,522 (Zagar) teaches compositions which comprise butyl rubber, polyethylene and a selected vulcanization accelerator.

U.S. Pat. No. 3,584,080 (Walker et al) teaches the vulcanization of a butyl rubber terpolymer with a free radical curing agent. A minor amount of polyethylene may be included in these compositions.

U.S. Pat. No. 3,265,770 (Edwards) teaches a complex process wherein a butyl rubber-polyethylene blend is first treated at high temperature with a peroxide in order to partially crosslink the polyethylene, and then treated at a lower temperature with a curative for the butyl rubber.

More recently, U.S. Pat. No. 3,909,463 (Hartman) discloses a process for grafting a polyolefin plastic with a rubber which may be butyl rubber, using a bi-functional phenol-aldehyde curing agent. Hartman surprisingly discloses that the resulting blends are merely grafted, and are not crosslinked.

Heretobefore, there has not been disclosed an elastoplastic composition comprising a blend of butyl terpolymer rubber and polypropylene wherein the blend is treated with a peroxide curing agent.

SUMMARY OF THE INVENTION

The present invention provides an elastoplastic composition comprising a blend of from 20 to 45 parts by weight of thermoplastic polypropylene and, correspondingly to 100 parts by weight, from 80 to 55 parts by weight butyl terpolymer rubber comprising a major portion of isobutylene, a minor portion of isoprene and a minor portion of a divinyl aromatic monomer of the formula:

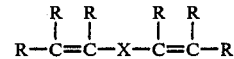

wherein X is an aromatic nucleus and each R, which may be the same or different, is selected from hydrogen and a $C_{1-5}$ alkyl, wherein said composition is characterized by being treated with peroxide curing agent selected from organic rubber and polypropylene would appear to be a particularly unlikely composition for use as an elastoplastic material having useful physical properties.

Indeed, the present invention does not utilize butyl rubber, but instead uses a "butyl terpolymer rubber". As used herein, the term butyl terpolymer rubber refers to a polymer which is prepared by polymerizing isobutylene and isoprene in the ratios described above with a minor amount (less than 10 weight per cent) of a divinyl aromatic monomer of the formula:

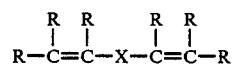

wherein X is an aromatic (aryl) moeity, and each R may be the same or different and is selected from hydrogen or a $C_{1-5}$ alkyl. Divinyl benzene is a preferred example of the above divinyl aromatic monomer. Methods of preparing butyl terpolymer rubber are described in detail in U.S. Pat. 2,671,774 (McCracken).

Preferred butyl terpolymer rubber for use in the present invention comprises from 96 to 98.5 weight per cent isobutylene, from 0.5 to 2.5 weight per cent isoprene and from 0.5 to 2.5 weight per cent divinylbenzene. Butyl terpolymer rubber may also be characterized by viscosity and solubility characteristics. Highly preferred butyl terpolymer rubber has a Mooney viscosity ($ML_{1+8}$ at 125° C.) of from 50 to 80 and has a solubility of from to 35 weight per cent (as determined by weight per cent soluble in cyclohexane, after 48 hours at 23° C., when the solubility test is completed in darkness).

It has now been discovered that elastoplastic peroxides and organic hydroperoxides.

The present elastoplastic compositions comprise a blend of from 55 to 80 parts by weight butyl terpolymer rubber, from 45 to 20 parts by weight polypropylene and are treated with an organic peroxide curative. Compositions which contain too little butyl terpolymer rubber do not demonstrate rubbery behavior and blends which contain too much rubber have a non-homogeneous, scorched appearance.

Polypropylene is a known thermoplastic polymer, and methods of its production have been well described in the literature. Molecular weight, molecular structure, melting temperature, density and melt flow index are parameters which typically are used to describe polypropylene resins. For reasons of cost and convenience, it is preferred to use commercially available, isotactic polypropylene homopolymer in the present invention. Especially preferred polypropylene has a melt flow index of between 3 and 5 grams per 10 minutes (ASTM D 1238, at 230° C., under 2.16 kg load).

It is well known that polypropylene is degraded when treated with free radical curing agents (particularly peroxides). Several theories have been advanced to explain this observed phenomenon. While not wishing to be bound by any particular theory, it is believed that peroxides abstract a hydrogen atom from the polypropylene chain, thus leaving a radical which initiates subsequent rapid scission of the polymer.

Butyl rubber is a commercially available copolymer of from 97 to 99.5 weight per cent isobutylene and 3 to 0.5 weight per cent isoprene. It shares a common characteristic with polypropylene, namely, that it is also degraded by peroxide curing agents.

Accordingly, a peroxide cured blend of butyl blends having a good balance of elastomeric properties (such as low compression set and low tension set) and plastic properties (particularly melt flow index) can be prepared by treating a blend of butyl terpolymer rubber and polypropylene with a peroxide curing agent. That is, the presence of the butyl terpolymer rubber surprisingly inhibits the peroxide-induced degradation of the polypropylene contained in the present compositions, and Permits the production of an elastoplastic material having particularly useful properties.

Highly preferred compositions of the present invention further contain a reinforcing filler and oil.

The preferred reinforcing fillers are selected from amorphous silica, magnesium silicate and small particle size carbon black. As used herein, the term "small particle size carbon black" refers to carbon black having a mean particle size of less than 100 millimicrons (commonly referred to as ASTM types SAF, ISAF, HAF, EPC, FFF, HMF and SRF, or, in the alternative as ASTM types in the "100" to "700" series). When employed, the total amount of reinforcing filler is preferably between 2 and 20 parts by weight, based on the combined weight of butyl terpolymer rubber and polypropylene.

Oil has the effect of softening the present compositions, which is desired for certain applications. Preferred oils are essentially non-volatile and non polar, such as the napthenic and parafinic oils which typically are used in oil-extended rubber compounds. The amount of oil should not exceed 80 parts by weight and is preferably between 5 and 60 parts by weight per 100 parts combined weight of butyl terpolymer rubber and polypropylene.

The peroxide curing agents which are used in the present invention are selected from organic peroxides and organic hydroperoxides. Non limiting examples include di-t-butyl peroxide, cumyl peroxide, benzoyl peroxide, t-amyl peroxide, 2,5-di-t-(butyl peroxy)-2,5 dimethyl hexane, cumyl hydroperoxide and t-butyl hydroperoxide organic peroxides are preferred, particularly cumyl peroxide and ethyl 3,3-di-(t-butyl peroxy butryate).

The amount of peroxide used should be from 0.1 to 5 weight per cent (especially from 0.2 to 2 per cent) of active peroxide, based on the combined weight of the polypropylene ad butyl terpolymer rubber.

Other additives which are typically used in rubber or plastic compounds, such as antioxidants, colorants, stabilizers and non-reinforcing fillers may also be used in the present invention. Furthermore, the use of a minor amount of other polymers (up to 15 per cent of the total polymer weight), such as diene or monolefin rubbers or monolefin thermoplastics, may be tolerated provided that such other polymers do not have a serious deleterious effect on the physical properties of the present elastoplastic compositions.

The present invention also provides a process to prepare an elastoplastic composition comprising (i) 55 to 80 parts by weight of a butyl terpolymer rubber, wherein said butyl terpolymer rubber is a copolymer of a major portion of isobutylene, a minor portion of isoprene, and a minor portion of a divinyl aromatic monomer of the formula

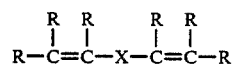

wherein X is an aromatic nucleus, and the symbols R, which may be the same or different, are selected from hydrogen and a $C_{1-5}$ alkyl;
(ii) correspondingly to 100 parts by weight, from 45 to 20 parts by weight of thermoplastic polypropylene
(iii) a peroxide curing agent selected from organic peroxides and organic hydroperoxides, wherein said process consists of
  (A) mixing and shearing in a polymer mixer said (i), (ii) and (iii) at a temperature above the activation temperature of said peroxide and above the softening temperature of said polypropylene
  (B) subsequently adding to said polymer mixer a free radical scavenger, and further mixing said composition with said free radical scavenger.

The process is preferably completed at a temperature above the melting point of the polypropylene, especially at from 175° to 185° C.

The temperature of process affects the activity of the peroxide. As is well known to those skilled in the art, a minimum temperature is required before the peroxide decomposes (commonly referred to as the "activation temperature"). It is especially preferred to use peroxides which have a "half life" (i.e., the time required for about 50 per cent of the peroxide to decompose) of less than two minutes (particularly, less than 1 minute) at the temperature of the mixing process.

After the peroxide has been mixed with the composition for a period of time equivalent to about 1 to 2 "half lives" of the peroxide, it is preferred to treat the composition with a free radical scavenger. As used herein, the term free radical scavenger refers to compounds which deactivate peroxide curing agents. Particularly preferred free radical scavengers include commercially available antioxidants (Rubber World Blue Book, 1988 Edition, pages 128 to 142), especially hindered-phenolic compounds.

A highly preferred embodiment of the present process is described below.

Initially, butyl terpolymer rubber, amorphous silica filler and oil are added to a pre-heated polymer mixer (165–170° C.) and mixed for about 3 minutes. The polypropylene is then added and mixing is continued until the mixer temperature reaches about 180° C.(usually 2–3 minutes). A peroxide selected from dicumyl peroxide and ethyl 3,3-di-(t-butyl peroxy butyrate) is then added and mixing is continued for between 20 and 210 seconds, at which time the peroxide is quenched by a hindered phenolic-type antioxidant. A minor amount of oil (about 3–5 parts by weight) is added to the mixer at this time, and the composition is mixed for a final three minute period before being discharged from the mixer.

The invention is further described by the following non-limiting examples, in which percentages are by weight unless otherwise indicated.

The ingredients used in the following examples are identified below:

PP1: An isotactic polypropylene homopolymer having a melt flow index of 12 g/10 min (ASTM D1238, at 230° C., under a 2.16 kg load), sold under the tradename PROFAX ® 6331 by Himon Limited.

PP2: An isotactic polypropylene homopolymer having a melt flow index of 4 g/10 min (ASTM D 1238, at 230° C., under a 2.16 kg load), sold under the tradename PROFAX ® PD893 by Himont.

Butyl TP: A butyl terpolymer rubber comprising about 97.5 per cent isobutylene, 1.5 per cent isoprene and 1 per cent divinylbenzene, having a solubility of about 25 per cent (as measured in cyclohexane at 23° C., after 48 hours in darkness), sold under the tradename POLYSAR ® Butyl XL1000 by Polysar Limited.

A01: a hindered phenolic antioxidant (reported to be thiodiethylene bis (3,5-di-t-butyl-4-hydroxyhydrocinnamate), sold under the tradename IRGANOX ® 1035 by Ciba-Geigy Limited.

A02: a hindered phenolic antioxidant(reported to be 2,2 methylene-bis (4-methyl-6-t-butyl phenol) ), sold under the tradename Antioxidant 2246 by American Cyanamid.

Peroxide 1: Dicumyl peroxide, sold under the tradename DICUP ® 40 C.

Peroxide 2: Ethyl 3,3-Di-(5-butylperoxy) butyrate, sold under the tradename LUPERCO ® 233-XL by Pennwalt.

Filler N: Calcium carbonate

OIL: A naphthenic oil, sold under the tradename CIRCOSOL ® 4240 by Sun Oil.

COLOR 1: A white titanium-oxide based colorant.

COLOR 2: A proprietary colorant composition sold under the tradename MB 10-805 by Canada Colour.

Filler 1: Amorphous silica, sold under the tradename HISIL ® 233.

ZDC: Zinc dimethyl dithiocarbamate.

EXAMPLE 1

In each of the experiments of this example, the ingredients shown in table 1 were added to a brabender-type mixer which was pre-heated to a temperature of approximately 180° C., and mixed for a period of 6 to 8 months.

Physical properties were measured according to conventional test procedures, including ASTM D412 (modulus, tensile, elongation and tension set); ASTM D395 (compression set; 70 hours at 70° C.); ASTM D1238 (melt flow index: at 190° C., under 21.6 kg load); ASTM D2240 (hardness) and ASTM D1053 (Gehman low temperature properties).

Results from the physical property testing are shown in table 1.

Experiment 1 of example 1 was completed without peroxide, as a comparative experiment.

TABLE 1

| BRABENDER MIXING OF PP/XL20 | | | | | | |
|---|---|---|---|---|---|---|
| | EXPERIMENT | | | | | |
| | 1 | 2 | 3 | 4 | 5 | 6 |
| INGREDIENTS (parts by weight) | | | | | | |
| PPI | 18. | 18. | 18. | 18. | 18. | 18. |
| BUTYL TP | 42. | 42. | 42. | 42. | 42. | 42. |
| AO 1 | 0.3 | 0.3 | 0.3 | 0.3 | 0.3 | 0.3 |
| PEROXIDE | — | 0.12 | 0.24 | 0.36 | 0.48 | 0.6 |
| AO 2 | — | 0.12 | 0.24 | 0.24 | 0.24 | 0.24 |

TABLE 1-continued

| BRABENDER MIXING OF PP/XL20 | | | | | | |
|---|---|---|---|---|---|---|
| | EXPERIMENT | | | | | |
| | 1 | 2 | 3 | 4 | 5 | 6 |
| Physical Properties | | | | | | |
| Hardness (A-2) | 80 | 80 | 84 | 84 | 84 | 80 |
| 100% modulus | 3.9 | 3.7 | 4.9 | 6.0 | 5.3 | 5.2 |
| Tensile | 3.5 | 4.1 | 7.3 | 9.2 | 8.6 | 7.9 |
| Elongation | 120 | 180 | 275 | 260 | 255 | 225 |
| Tension Set (% set) | 41.3 | 28.7 | 27.3 | 26.7 | 22.7 | 22.7 |
| Compression Set (%) 70 hrs @ 70° C. | 94.7 | 89.7 | 56.9 | 48.7 | 47.9 | 45.7 |
| Gehman | | | | | | |
| $T_2$ | −9.4 | −10.8 | −6.3 | −8.1 | −14.3 | −6.0 |
| $T_5$ | −35.9 | −38.8 | −39.3 | −42.4 | −44.2 | −39.5 |
| $T_{10}$ | −47.0 | −48.8 | −51.8 | −54.6 | −54.2 | −51.6 |
| $T_{100}$ | −68.2 | −67.7 | −70.0 | −69.0 | −69.0 | −70.0 |
| Melt Flow Index (grams/10 min) | 77.4 | 41.1 | 72.9 | 73.4 | 86.2 | 108.5 |

EXAMPLE 2

In each of the experiments of this example, the ingredients listed in part A of table 2 were initially added to a brabender-type mixer which was heated to approximately 175° C. and mixed for about 3 minutes.

The peroxide (part B) was then added and mixing was continued for about 30 seconds.

The ingredients of Part C were subsequently added, followed by a final 3–4 minutes of mixing. The compositions were then discharged from the mixer, molded into test samples, and tested according to the procedures referred to in example 1.

In addition, the aging characteristics of the compositions were measured, according to ASTM D411.

TABLE 2

| | EXPERIMENT | | | | | |
|---|---|---|---|---|---|---|
| | 20 | 21 | 22 | 23 | 24 | 25 |
| INGREDIENTS (parts by weight) | | | | | | |
| PART A | | | | | | |
| PPI | 12 | 12 | 12 | 8 | 8 | 8 |
| BUTYL TP | 28 | 28 | 28 | 32 | 32 | 32 |
| OIL | 12 | 12 | 12 | 12 | 12 | 12 |
| AO1 | 0.2 | 0.2 | 0.2 | 0.2 | 0.2 | 0.2 |
| COLOR 1 | 1.2 | 1.2 | 1.2 | 1.2 | 1.2 | 1.2 |
| FILLER N | 8 | 8 | 8 | 8 | 8 | 8 |
| PART B | | | | | | |
| PEROXIDE | 0.8 | 1.2 | 1.6 | 0.8 | 1.2 | 1.6 |
| PART C | | | | | | |
| ZDC | 0.4 | 0.4 | 0.4 | 0.4 | 0.4 | 0.4 |
| COLOR 2 | — | — | — | 2 | 2 | 2 |
| Physical Properties | | | | | | |
| Hardness (A-2) | 76 | 77 | 73 | 62 | 62 | 63 |
| 100% modulus (MPa) | 2.8 | 2.9 | 2.8 | 1.5 | 1.5 | 1.8 |
| Tensile (MPa) | 4.4 | 4.3 | 4.5 | 2.7 | 2.7 | 3.5 |
| Elongation (%) | 290 | 245 | 280 | 320 | 275 | 310 |
| Tension Set (% set) | 20 | 18 | 18 | 10 | 10 | 8 |
| Die C Tear (kNm) | 22.8 | 21.7 | 22.0 | 13.7 | 13.8 | 14.2 |
| Ageing in Air 168 hrs. @ 100° C. | | | | | | |
| Hardness | 80 | 81 | 78 | 62 | 60 | 65 |
| 100% modulus (MPa) | 3.4 | 3.1 | 3.2 | 1.6 | 1.7 | 1.8 |
| Tensile (MPa) | 4.4 | 4.6 | 4.5 | 3.0 | 3.2 | 3.3 |
| Elongation (%) | 285 | 260 | 225 | 315 | 285 | 310 |
| Compression Set | | | | | | |

TABLE 2-continued

| | EXPERIMENT | | | | | |
|---|---|---|---|---|---|---|
| | 20 | 21 | 22 | 23 | 24 | 25 |
| (%) 70 hrs @ 70° C. | 53.8 | 51.3 | 58.3 | 43.6 | 49.3 | 40.0 |
| M.F.I (grams/10 min) | >200 | >200 | >200 | 84.4 | 102.5 | 70.7 |

EXAMPLE 3

The experiments of this example were completed as follows.

The ingredients listed in part A of table 3 were added to a banbury-type mixer which was preheated to about 170° C. and mixed for a period of approximately 3 minutes.

The peroxide (part B) was then added, followed by about 40 seconds of mixing before the addition of the ingredients listed in part C. The composition was mixed for a final 3 minutes before being discharged from the mixer.

Note that the antioxidant was included in part C, and hence was added after the peroxide.

Properties of the compositions of this example are shown in table 3. The strength, compression set and melt flow index of the compositions shown in table 3 are generally superior to the corresponding properties of the compositions of example 2.

TABLE 3

| | EXPERIMENT | | |
|---|---|---|---|
| | 30 | 31 | 32 |
| INGREDIENTS (parts by weight) | | | |
| PART A | | | |
| BUTYL IP | 770 | 750 | 675 |
| PPI | 330 | 250 | 225 |
| PART B | | | |
| PEROXIDE | 22 | 20 | 18 |
| PART C | | | |
| OIL | — | 100 | 180 |
| ZDC | 5.5 | 5.0 | 4.5 |
| AO1 | 5.5 | 5.0 | 4.5 |
| COLOR 1 | 11.0 | 10.0 | 9.0 |
| Physical Properties | | | |
| Hardness (A-2) | 84 | 70 | 72 |
| 100% modulus (MPa) | 4.7 | 3.5 | 3.1 |
| Tensile (MPa) | 8.2 | 7.5 | 6.3 |
| Elongation (%) | 275 | 280 | 245 |
| Tension Set (% set) | 50.7 | 38.7 | 16.0 |
| Die Tear (kNm) | 33.2 | 21.9 | 16.1 |
| Ageing in Air 168 hrs. @ 100° C. | | | |
| Hardness (A-2) | 79 | 74 | 72 |
| 100% modulus (MPa) | 5.1 | 3.7 | 3.3 |
| Tensile (MPa) | 8.5 | 6.7 | 6.4 |
| Elongation (%) | 250 | 240 | 235 |
| Compression Set (%) 70 hrs @ 70° C. | >200 | 165.4 | >200 |
| M.F.I. (grams/10 min) | | | |

EXAMPLE 4

The experiments of this example were completed using the procedure generally described in example 3, except that a brabender-type mixer was used instead of a banbury-type mixer.

The amount of peroxide used in the experiments of this example was less than that used in the experiments of example 3.

Table 4 shows that the physical properties of the composition can be altered by adjusting the amount of peroxide.

TABLE 4

| | EXPERIMENT | | | | |
|---|---|---|---|---|---|
| | 40 | 41 | 42 | 43 | 44 |
| INGREDIENTS (parts by weight) | | | | | |
| PART A | | | | | |
| PP | 15 | 15 | 10 | 10 | 10 |
| BUTYL TP | 35 | 35 | 40 | 40 | 40 |
| OIL | 15 | 15 | 15 | 15 | 15 |
| COLOR 1 | 1.5 | 1.5 | 1.5 | 1.5 | 1.5 |
| PART B | | | | | |
| PEROXIDE | 0.37 | 0.5 | 0.5 | 0.75 | 1.0 |
| PART C | | | | | |
| ZOC | 0.25 | 0.25 | 0.25 | 0.25 | 0.25 |
| AO1 | 0.25 | 0.25 | 0.25 | 0.25 | 0.25 |
| Physical Properties | | | | | |
| Hardness A-2 | 74 | 73 | 71 | 57 | 61 |
| 100% modulus | 3.1 | 3.0 | 2.5 | 1.7 | 1.8 |
| Tensile | 5.7 | 5.8 | 5.2 | 4.5 | 4.6 |
| Elongation | 320 | 330 | 315 | 345 | 320 |
| Tension Set (% set) | 20 | 20 | 12 | 8 | 8 |
| Compression Set (%) 70 hrs @ 70 C | 63.9 | 58.9 | 58.4 | 32.4 | 37.8 |
| Gehman | | | | | |
| $T_2$ | −7.8 | | −8.8 | −60.0 | −27.0 |
| | −13.8 | | | | |
| $T_5$ | −33.4 | −33.5 | −60.2 | −32.0 | −37.1 |
| $T_{10}$ | −45.5 | −46.6 | −60.5 | −45.7 | −46.3 |
| $T_{100}$ | −66.0 | −68.0 | −63.6 | −60.5 | −60.4 |
| M.F.I. (grams/10 min) | >200 | >200 | >200 | 143.19 | 123.87 |

EXAMPLE 5

The experiments of this example were completed as follows.

The ingredients shown in part A of Table 5 were added to a banbury-type mixer which was pre-heated to about 170° C. and mixed for approximately 3 minutes. Part B (the polypropylene) was then added and the mixing continued until the temperature reached 180° C. (usually 2 to 3 minutes). The peroxide (part C) was then added and mixing was continued for about 30 seconds, at which time part D was added.

The compositions of this example were easily discharged from the mixer, with little or no adhesion to the mixer.

Physical properties of these compositions are shown in Table 5.

TABLE 5

| | EXERIMENT | | | |
|---|---|---|---|---|
| | 50 | 51 | 52 | 53 |
| INGREDIENTS (parts by weight) | | | | |
| PART A | | | | |
| BUTYL TP | 490 | 490 | 490 | 490 |
| OIL | 175 | 175 | 175 | 175 |
| FILLER 1 | 105 | 105 | 105 | 105 |
| PART B | | | | |
| PP 2 | 210 | 210 | 210 | 210 |
| PART C | | | | |
| PEROXIDE | 14 | 14 | 14 | 14 |
| PART D | | | | |
| ZDC | 3.5 | 3.5 | 3.5 | 3.5 |
| AO1 | 3.5 | 3.5 | 3.5 | 3.5 |
| COLOR 1 | 3.5 | 3.5 | 3.5 | 3.5 |
| COLOR 2 | 7.0 | 7.0 | 7.0 | 7.0 |
| Physical Properties | | | | |
| Hardness (A-2) | 78 | 78 | 78 | 78 |
| 100% modulus (MPa) | 3.3 | 3.2 | 3.2 | 3.1 |
| Tensile (MPa) | 4.8 | 4.5 | 4.6 | 4.1 |

TABLE 5-continued

| | EXPERIMENT | | | |
|---|---|---|---|---|
| | 50 | 51 | 52 | 53 |
| Elongation (%) | 230 | 230 | 240 | 210 |
| Tension Set (% set) | 20.0 | 18.0 | 18.7 | 19.3 |
| Die C Tear (kNm) | 21.6 | 22.5 | 22.6 | 21.5 |
| Ageing in Air | | | | |
| 168 hrs. 125° C. | | | | |
| 100% modulus | 3.7 | 3.6 | 3.7 | 3.5 |
| Tensile (MPa) | 4.5 | 4.1 | 4.6 | 4.2 |
| Elongation (%) | 170 | 145 | 190 | 160 |
| Compression Set (%) | 40.8 | 38.5 | 39.0 | 31.9 |
| 70 hrs @ 70° C. | | | | |
| M.F.I. (grams/10 min) | >200 | >200 | >200 | 129.3 |

EXAMPLE 6

This is a comparative example, using brominated butyl rubber instead of butyl terpolymer rubber. The brominated butyl rubber employed was a commercially available rubber comprising about 97 per cent isobutylene, 1.5 percent isoprene and 1.5 percent bromine.

The experiments of this example were completed in a brabender mixer by first mixing the Part A ingredients at a temperature of about 180° C. for about 3 minutes, then adding the peroxide and mixing for about thirty seconds, then adding the antioxidant and mixing for a final period of about 3 minutes.

A halogen scavenger magnesium oxide) was included in the ingredients of part A because bromobutyl rubber may be partially de-brominated under the mixing conditions used.

The physical properties of the compositions of these comparative experiments are generally poor, as shown in Table 6.

TABLE 6

| | EXPERIMENT | | | | | |
|---|---|---|---|---|---|---|
| | 60 | 61 | 62 | 63 | 64 | 65 |
| INGREDIENTS (parts by weight) | | | | | | |
| PART A | | | | | | |
| PPI | 18 | 18 | 18 | 12 | 12 | 12 |
| BROMOBUTYL | 42 | 42 | 42 | 48 | 48 | 48 |
| MgO | 1.0 | 1.0 | 1.0 | 1.0 | 1.0 | 1.0 |
| AO1 | 0.3 | 0.3 | 0.3 | 0.3 | 0.3 | 0.3 |
| PART B | | | | | | |
| PEROXIDE | | .12 | .24 | — | .12 | .24 |
| PART C | | | | | | |
| AO2 | .12 | .12 | .12 | .12 | .12 | .12 |
| Physical Properties | | | | | | |
| Hardness (A-2) | 80 | 70 | 72 | 48 | 42 | 55 |
| 100% modulus (MPa) | 2.8 | 1.7 | 2.6 | 0.7 | 1.0 | 1.0 |
| Tensile (MPa) | 2.6 | 1.9 | 2.8 | 0.6 | 0.8 | 1.5 |
| Elongation (%) | 280 | 3650 | 210 | — | — | 460 |
| Tension Set (% set) | 74.0 | 55.3 | 38.0 | 51.3 | 45.3 | 24.0 |
| Compression Set (%) | 90.9 | 97.8 | 86.5 | 103.7 | 93.2 | 84.2 |
| 70 hrs @ 70° C. | | | | | | |
| M.F.I. (grams/10 min) | 53.2 | 41.0 | 16.2 | 25.0 | 24.3 | 9.2 |

What is claimed is:

1. An elastoplastic composition comprising a blend of from 20 to 45 parts by weight of thermoplastic polypropylene and, correspondingly to 100 parts by weight, from 80 to 55 parts by weight butyl terpolymer rubber comprising a major portion of isobutylene, a minor portion of isoprene and a minor portion of a divinyl aromatic monomer of the formula:

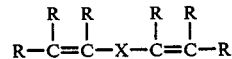

wherein X is an aromatic nucleus and each R, which may be the same or different, is selected from hydrogen and a $C_{1-5}$ alkyl, wherein said composition is characterized by being vulcanized solely with a peroxide curing agent selected from organic peroxides and organic hydroperoxides.

2. The composition of claim 1 which further comprises from 5 to 60 parts by weight of oil and from 2 to 20 parts by weight of a reinforcing filler selected from carbon black having a mean particle size of less than 100 millimicrons, amorphous silica and magnesium silicate.

3. The composition of claim 1 wherein said divinyl aromatic monomer is divinyl benzene.

4. The composition of claim 1 wherein said butyl terpolymer rubber comprises from 96 to 98.5 weight per cent isobutylene, from 0.5 to 2.5 weight percent isoprene and from 0.5 to 2.5 weight per cent divinylbenzene and is further characterized by having a Mooney viscosity ($ML_{1+8}$ at 125° C.) of from 50 to 80 and a solubility of from 15 to 35 weight percent (as determined by weight per cent soluble in cyclohexane, after 48 hours at 23° C., when the solubility test is complete in darkness).

5. A process to prepare an elastoplastic composition comprising
   (i) 55 to 80 parts by weight of a butyl terpolymer rubber, wherein said butyl terpolymer rubber is a copolymer of a major portion of isobutylene, a minor portion of isoprene, and a minor portion of a divinyl, aromatic monomer of the formula

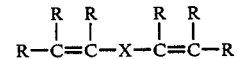

wherein X is an aromatic nucleus, and the symbols R, which may be the same or different, are selected from hydrogen and a $C_{1-5}$ alkyl;
   (ii) correspondingly to 100 parts by weight, from 45 to 20 parts by weight of thermoplastic polypropylene
   (iii) a peroxide curing agent selected from organic peroxides and organic hydroperoxides, wherein said process consists of
      (A) mixing and shearing in a polymer mixer said (i), (ii) and (iii) at a temperature above the activation temperature of said peroxide and above the softening temperature of said polypropylene
      (B) subsequently adding to said polymer mixer a free radical scavenger, and further mixing said composition with said free radical scavenger, wherein said process is characterized by utilizing said peroxide curing agent as the sole vulcanization agent.

6. The process of claim 5 wherein said composition further comprises from 5 to 60 parts by weight of oil and from 2 to 20 parts by weight of a reinforcing filler selected from carbon black having a mean particle size of less than 100 millimicrons, amorphous silica and magnesium silicate.

7. The process of claim 6 wherein said divinyl aromatic monomer is divinyl benzene.

8. The process of claim 7 wherein said mixing and shearing is completed at a temperature of from 165° to 185° C., said peroxide is dicumyl peroxide and said free radical scavenger is a hindered phenolic antioxidant.

* * * * *